(12) United States Patent
Hosokai et al.

(10) Patent No.: US 7,506,557 B2
(45) Date of Patent: Mar. 24, 2009

(54) ANTI-BACKLASH NUT

(75) Inventors: Yutaka Hosokai, Nagaoka (JP); Hiroki Oodaira, Ojiya (JP)

(73) Assignee: KSS Kabushiki Kaisha, Niigataken (JP)

( * ) Notice: Subject to any disclaimer, the term of this patent is extended or adjusted under 35 U.S.C. 154(b) by 727 days.

(21) Appl. No.: 10/852,171

(22) Filed: May 25, 2004

(65) Prior Publication Data

US 2004/0250637 A1 Dec. 16, 2004

(30) Foreign Application Priority Data

May 26, 2003 (JP) ............... 2003-148216

(51) Int. Cl.
*F16H 25/20* (2006.01)
*F16H 57/12* (2006.01)
(52) U.S. Cl. ...................... 74/89.42; 74/411
(58) Field of Classification Search ............ 74/89.42, 74/409, 440, 441; 411/433
See application file for complete search history.

(56) References Cited

U.S. PATENT DOCUMENTS

| | | | | |
|---|---|---|---|---|
| 2,623,403 A | * | 12/1952 | Terdina | 74/89.39 |
| 2,690,682 A | * | 10/1954 | Passman | 74/441 |
| 4,954,032 A | | 9/1990 | Morales | |
| 6,142,032 A | * | 11/2000 | Creager | 74/441 |
| 2003/0094056 A1 | * | 5/2003 | Park | 74/89.42 |

FOREIGN PATENT DOCUMENTS

JP  10-47451  * 2/1998

* cited by examiner

*Primary Examiner*—William C Joyce
(74) *Attorney, Agent, or Firm*—Wenderoth, Lind & Ponack, L.L.P.

(57) ABSTRACT

An anti-backlash nut mechanism includes two segmental nuts composing a nut which are not separated when the nuts are disengaged from a male screw. An anti-backlash nut has a main nut and a trailing nut which can be engaged with a common male screw, a coil spring for biasing the main and trailing nuts away from each other, a cylindrical portion formed in conjunction with the main nut so as to surround the lead screw, an insert portion formed in conjunction with the trailing nut to be inserted into the cylindrical portion, pins projecting in the radial direction from either one of the cylindrical portion and the insert portion, and grooves formed around the other one of the cylindrical portion and the insert portion so as to receive the pins from the edge of the cylindrical portion and to engage with the pins in the turning direction of the nuts. The respective groove has a terminal section for capturing the pin in a condition in which the main and trailing nuts are disengaged from the male screw and are biased away from each other by the coil spring.

6 Claims, 9 Drawing Sheets

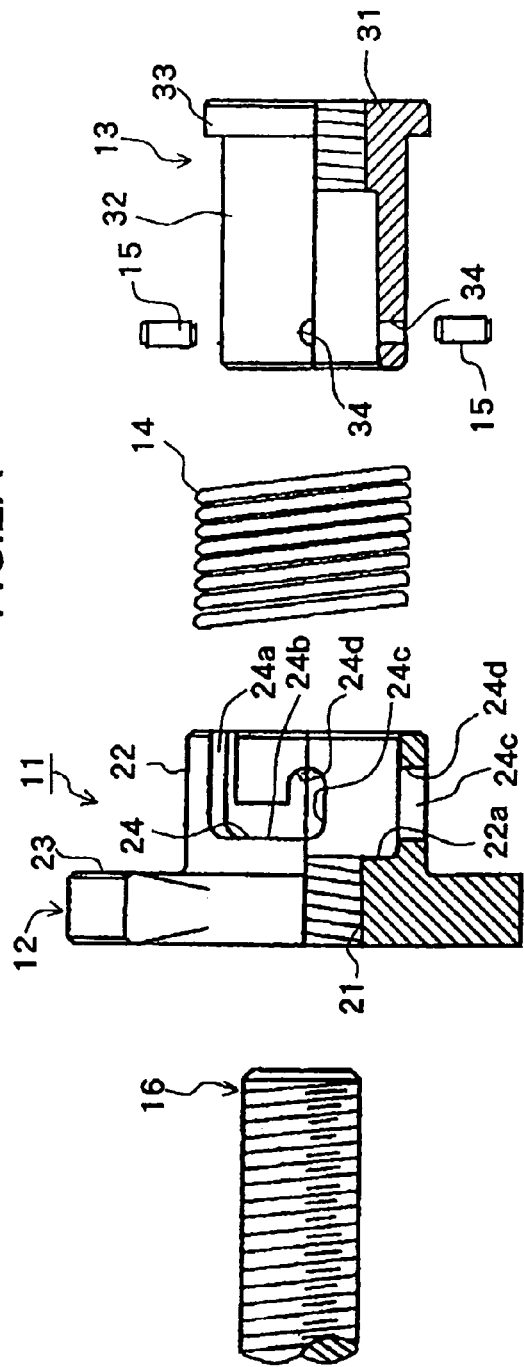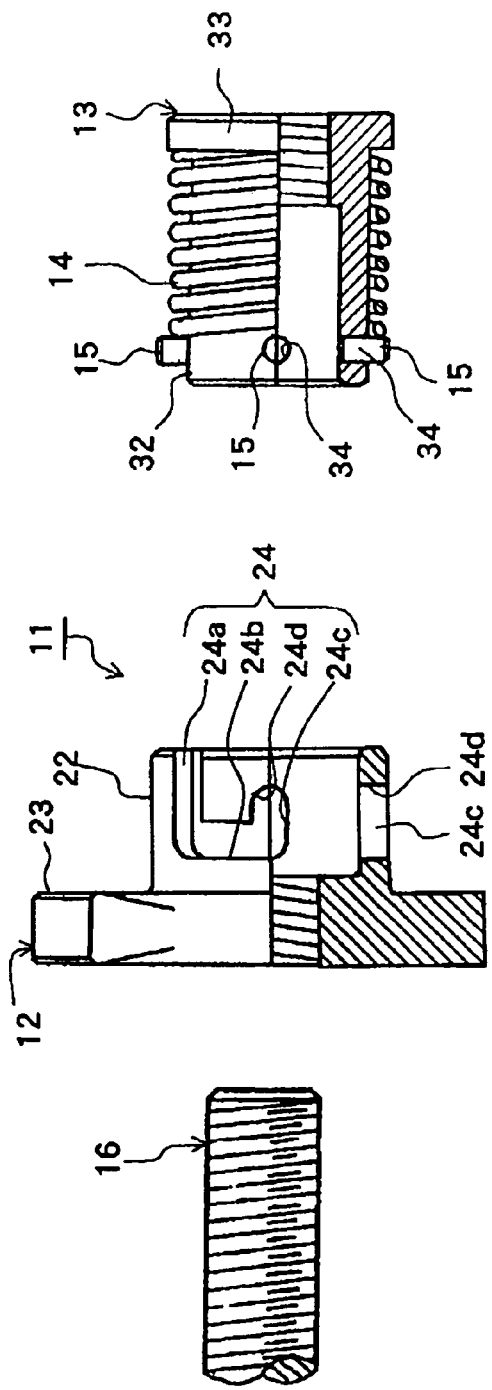

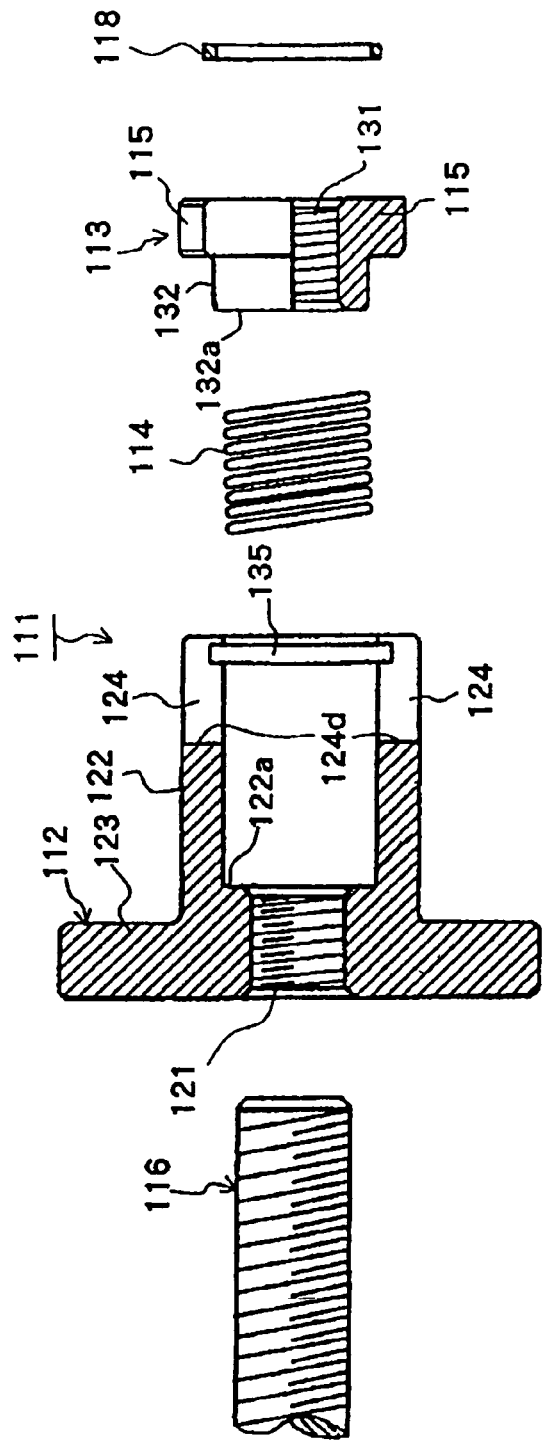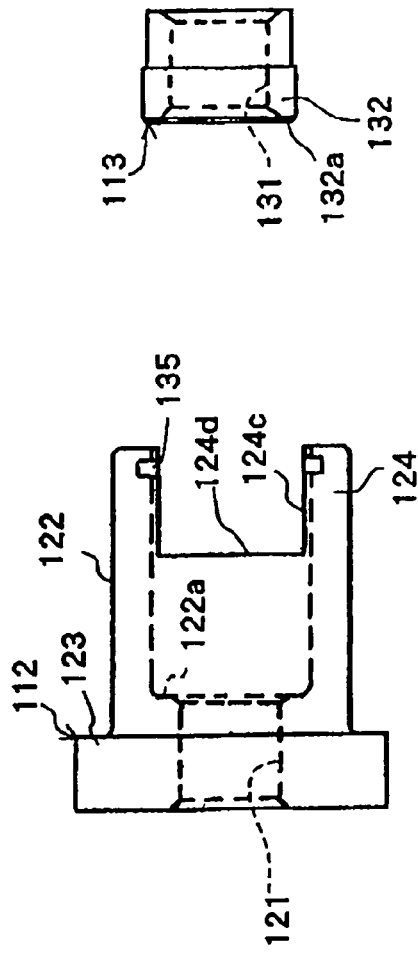

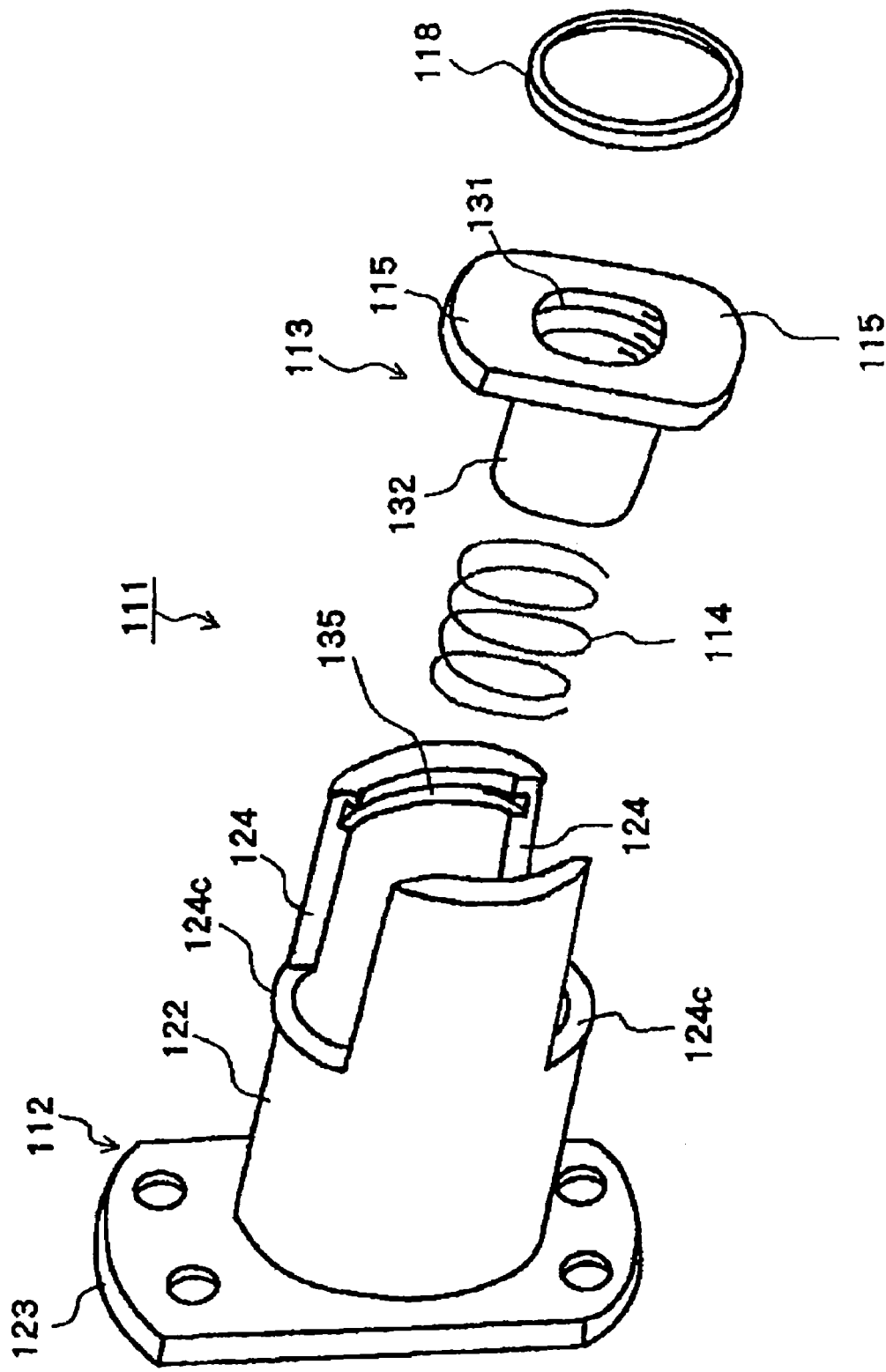

ANTI-BACKLASH NUT

BACKGROUND OF THE INVENTION

1. Field of the Invention

The present invention relates to an anti-backlash nut that causes no backlash between a lead screw and the nut composing a linear reciprocating device used in reciprocating a probe of a measuring apparatus, a table of a precision machine and a die in an extrusion molding machine for example.

2. Description of the Related Art

Hitherto, there has been an anti-backlash nut mechanism of a lead screw as shown in FIG. 9 as an invention illustrated in Japanese Utility Model Publication No. Hei 2-18378 that encompassed elimination of backlash between a lead screw and a nut.

This anti-backlash nut mechanism is designed to eliminate backlash of two nuts 902 and 903 by biasing the two nuts 902 and 903 away from each other by a spring 906 provided between the nuts 902 and 903 which are engaged with (screwed to) a lead screw 901 while engaging a pin 904 with a hole 905 so that the two nuts 902 and 903 turn together in the turning direction.

However, the prior art anti-backlash nut mechanism has had a problem in that either the nut 902, the nut 903 or the spring 906 may be lost because the nut 902, the nut 903 and the spring 906 are separated from each other when the nuts 902 and 903 are unscrewed from the lead screw 901.

U.S. Pat. No. 4,954,032 discloses an anti-backlash nut mechanism in which two nuts and a spring are not separated from each other even when the two nuts are unscrewed from a lead screw. This anti-backlash nut mechanism comprises a female nut segment having a hollow extension, adjustment slots and long guide grooves, a male nut segment having a plurality of guide fingers which are fixed by retaining grooves formed in a body portion and slots formed in a flange, and a compression spring. Both nut segments may be coupled in a body by guiding the guide fingers to the guide grooves and by anchoring lock stops at the edge of the guide fingers in the guide grooves in a condition in which the compression spring is provided in compression between the flanges of the both nut segments.

Accordingly, the anti-backlash nut mechanism has had a complicated structure as described above requiring the complicated female and male nut segments and the plurality of guide fingers formed in a body with the male nut segment. Still more, because the compression spring has been disposed so as to surround the body portion of the both nut segments and the guide fingers after assembly, it has been cumbersome to adjust the engagement of the guide fingers with the adjustment slots and to disassemble the respective parts.

SUMMARY OF THE INVENTION

The invention solves the above-mentioned problems by providing an anti-backlash nut mechanism wherein two segmental nuts composing a nut are not separated when the nuts are disengaged from a male screw.

According to one aspect of the invention, an anti-backlash nut comprises first and second nuts which can be screwed to a common male screw, a biasing member for biasing the first and second nuts away from each other, a cylindrical portion formed in conjunction with the first nut so as to surround the male screw, an insert portion formed in conjunction with the second nut to be inserted into the cylindrical portion, projections projecting in the radial direction from either one of the cylindrical portion and the insert portion, and grooves formed around the other one of the cylindrical portion and the insert portion so as to receive the projections from the edge of the cylindrical portion and to engage with the projections in the turning direction of the nuts. The respective grooves have a terminal portion for capturing the projection in a condition in which the first and second nuts are unscrewed from the male screw and are biased away from each other by the biasing member.

Preferably, the groove in the inventive anti-backlash nut is formed approximately in a shape of the letter L.

In the anti-backlash nut constructed in accordance to the first aspect of the invention, the insert portion of the first nut is inserted into the cylindrical portion of the second nut to advance the projections into the grooves. Because the biasing member biases the first and second nuts away from each other and the projections are captured at the terminal portions, and first and second nuts are held together with the biasing member. The projections move through the grooves and are captured by the terminal portions in this assembly, so that the projections engage with the grooves without being bent.

The first nut moves when the male screw is turned while stopping the first nut from turning temporarily in a condition in which the first and second nuts are assembled in unit and are screwed to the male screw. At this time, the second nut tries to turn together with the male screw. However, because the first nut restricts the rotation of the second nut through the engagement of the projections with the grooves, the second nut does not turn together with the male screw and moves together with the first nut even if it receives the turning force of the male screw.

Because the biasing member biases the first and second nuts away from each other, the first and second nuts move without causing backlash even when the turning direction of the male screw is changed.

According to another aspect of the invention, an anti-backlash nut comprises first and second nuts which can be screwed to a common male screw, a biasing member for biasing the first and second nuts in the direction of changing a distance between them, a receiving portion formed in conjunction with the first nut to receive the second nut and the biasing member, projections projecting in the radial direction from either one of the receiving portion and the second nut, grooves which are formed around the other one of the receiving portions and the second nut so as to receive the projections from the edge of the receiving portion and to engage with the projections in the turning direction of the nuts and a slip-out stopper for preventing the second nut and the biasing member which are inserted into the receiving portions from slipping out of the receiving portion.

Preferably, the groove in the inventive anti-backlash nut has a length of receiving the projection and of allowing the second nut and the biasing member to be arranged in an order of the second nut and the biasing member from the side closer to the first nut.

Preferably, the biasing member and the second nut in the inventive anti-backlash nut are arranged in an order of the biasing member and the second nut from the side closer to the first nuts.

Preferably, the slip-out stopper in the inventive anti-backlash nut has resilience so that it can be removably attached to the receiving portion.

In the anti-backlash nut constructed as described above in accordance to the second aspect of the invention, the first nut, the biasing member and the second nut may be assembled in unit by inserting the second nut and the biasing member to the receiving portion of the first nut to advance the projections into the grooves and by stopping the second nut and the biasing member from slipping out by the slip-out stopper in the end. In this assembly process, the projections move within the grooves and engage therewithwithout being bent.

The first nut moves when the male screw is turned while stopping the first nut from turning temporarily in a condition in which the first and second nuts are assembled in unit and are screwed to the male screw. At this time, the second nut tries to turn together with the male screw. However, because the first nut restricts the rotation of the second nut through the engagement of the projections with the grooves, the second nut does not turn together with the male screw and moves together with the first nut even if it receives the turning force of the male screw.

Because the biasing member biases the first and second nuts away from each other, the first and second nuts can move without causing backlash even when the turning direction of the male screw is changed.

The specific nature of the invention, as well as other objects, uses and advantages thereof, will clearly appear from the following description and from the accompanying drawings.

BRIEF DESCRIPTION OF THE DRAWINGS

FIGS. 1a and 1b show an anti-backlash nut of the first embodiment and a lead screw to which the nut is screwed, wherein FIG. 1a is a front view of the nut screwed to the lead screw and FIG. 1b is a partially section view of the nut in FIG. 1a.

FIGS. 2a and 2b show a procedure for assembling the nut, wherein FIG. 2a is an exploded view showing a main nut and a trailing nut partially in section and FIG. 2b shows the state in which a spring is assembled to the trailing nut.

FIGS. 4a and 4b show a state in which an anti-backlash nut of the second embodiment is screwed to a lead screw, wherein FIG. 4a is a front view and FIG. 4b is a plan view thereof.

FIGS. 5a and 5b are exploded views of the nuts, wherein FIG. 5a is a front view showing main and trailing nuts partially in section and FIG. 5b is a plan view thereof.

FIGS. 6a and 6b show operations for assembling the nut to the lead screw, wherein FIG. 6a shows a state in which the assembly of the nut is completed by assembling the trailing nut with the main nut and FIG. 6b shows a state in which the nut shown in section is screwed to the lead screw.

FIG. 7 is an exploded perspective view of the nut.

FIGS. 8a and 8b show a nut in a mode other than the second embodiment and a lead screw, wherein FIG. 8a is a front view in which the nut is shown in section and FIG. 8b is a plan view of the nut in FIG. 8a.

DETAILED DESCRIPTION OF THE PREFERRED EMBODIMENTS

An anti-backlash nut of the preferred embodiment of the invention will be explained below based on the drawings.

The nut of the embodiment which is capable of eliminating backlash and a lead screw to which such nut is screwed are comprised and used in a linear reciprocating device for example. Such a linear reciprocating device is built in a measuring apparatus, a precision machine and an extrusion molding machine to reciprocate a table, a die and the like.

(Anti-backlash Nut According to a First Embodiment)

Figure 1A:
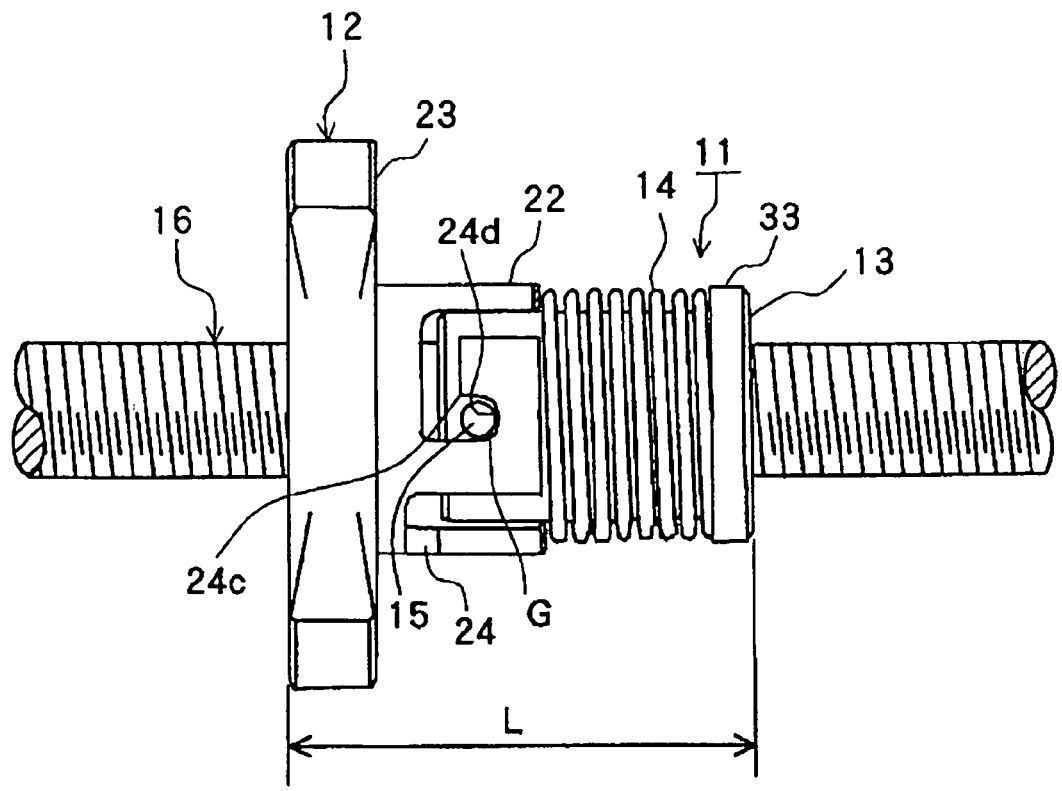
Figure 1B:
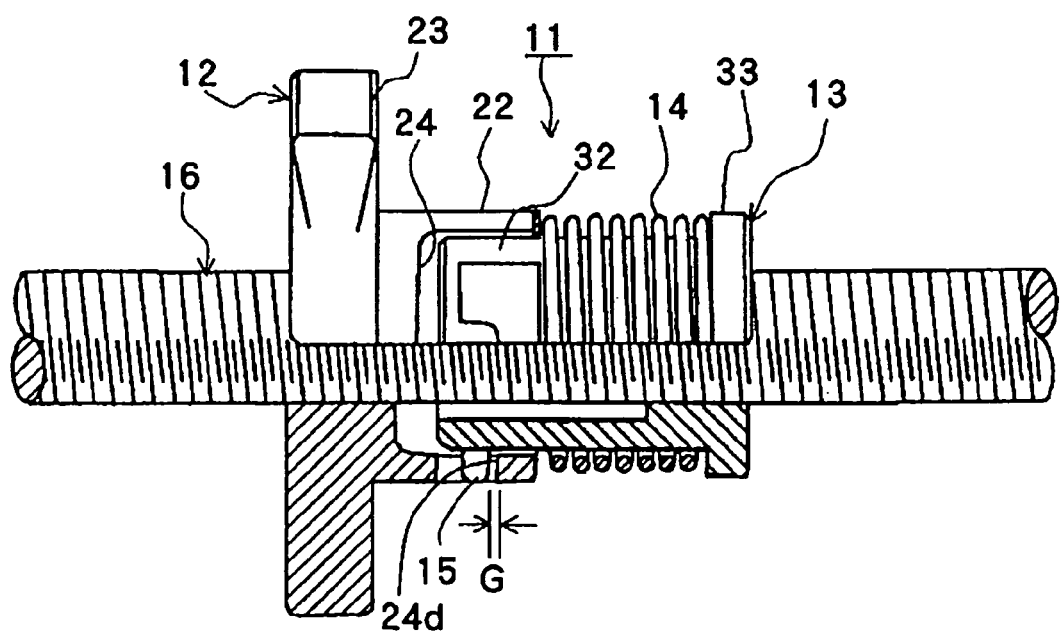

FIGS. 1a and 1b show an anti-backlash nut of the first embodiment and a lead screw to which the nut is screwed, wherein FIG. 1a is a front view showing the nut screwed to the lead screw and FIG. 1b is a partially section view of the nut in FIG. 1a.

Figure 3:
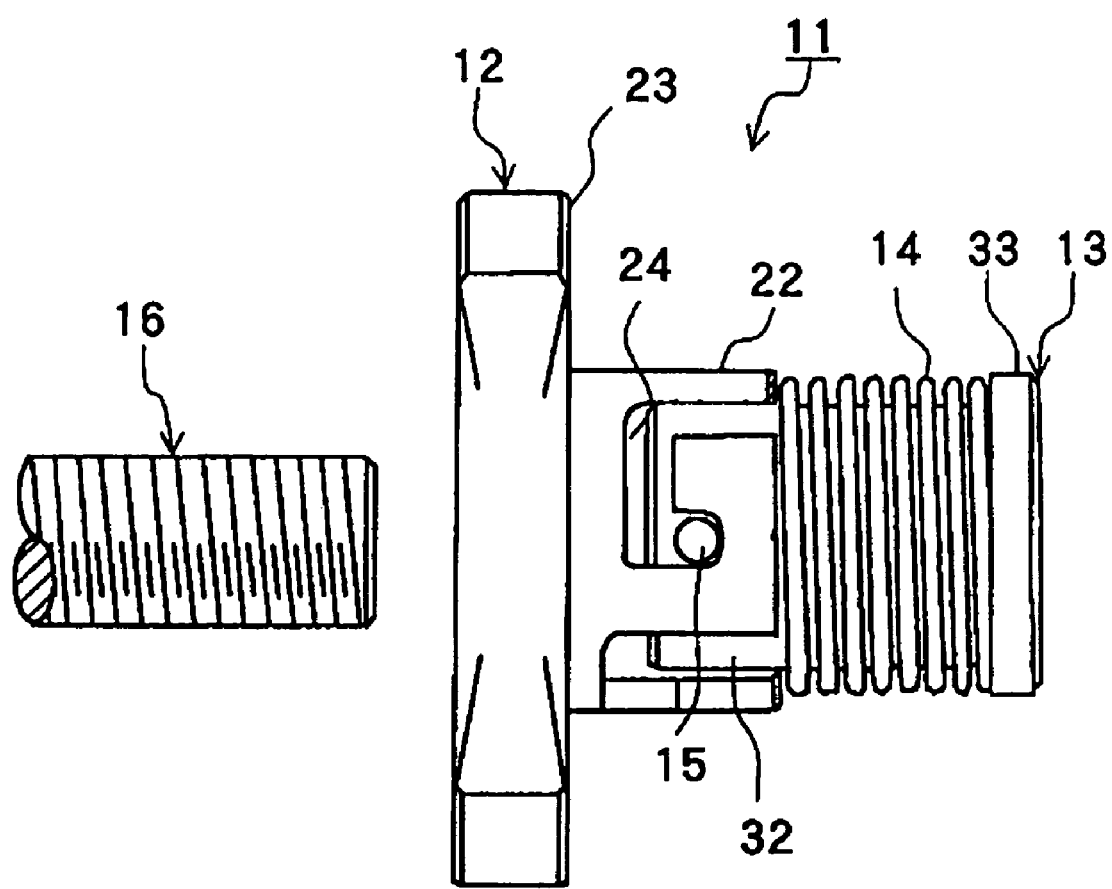
FIG. 3 shows a state in which the assembly of the nut is completed by assembling the trailing nut with the main nut.

FIGS. 2a and 2b show a procedure for assembling the nut, wherein FIG. 2a is an exploded view showing main and trailing nuts partially in section and FIG. 2b is an exploded view showing a condition in which a spring is assembled with the trailing nut. FIG. 3 shows a condition in which the assembly of the nut is completed by assembling the trailing nut with the main nut.

The structure of the nut will now be explained. The nut 11 comprises a main nut 12 for example as a first nut (or a second nut), a trailing nut 13 as a second nut (or a first nut), a coil spring 14 for example as a biasing member, and pins 15 for example as projections.

The main and trailing nuts 12 and 13 are screwed to a lead screw 16 for example as a common male screw. The main and trailing nuts 12 and 13 are formed with internal threads 21 and 31.

The main and trailing nuts 12 and 13 are made from metal or plastics. The lead screw 16 is also made from metal or plastics. In a case in which the main nut 12, the trailing nut 13 and the lead screw 16 are made from plastics, their abrasion resistance may be enhanced by a coating of Teflon (registered trademark). It is noted that although the shape of thread of the lead screw 16 may be of any type, such as trapezoidal or triangular thread, it is preferred to be that of a ball thread. The main and trailing nuts 12 and 13 have the thread corresponding to the above-mentioned thread of the lead screw.

The main nut 12 is provided with a cylindrical portion 22, e.g., a tubular part surrounding the lead screw 16, and a flange 23. The flange 23 is a part connected to the above-mentioned table, die or the like not shown.

The trailing nut 13 is provided with a cylindrical insert portion 32 which is to be inserted into the cylindrical portion 22 and a spring receiving flange 33. The insert portion 32 is provided with pins 15 that project outwardly in the radial direction. Four pins 15 are provided at equal intervals in the peripheral direction of the insert portion 32. The coil spring 14 is loosely fitted around the insert portion 32. The coil spring 14 is interposed between the pins 15 and the spring receiving flange 33. The coil spring 14 has a diameter capable of interposing between the spring receiving flange 33 of the trailing nut 13 and the cylindrical portion 22 of the main nut 12 when the trailing nut 13 is assembled with the main nut 12. It is noted that a resilient member such as a belleville spring and rubber having elasticity may be used instead of the coil spring 14.

The cylindrical portion 22 is provided with four grooves 24 at equal intervals in the peripheral direction thereof to receive the pins 15 from the edge of the cylindrical portion 22 and to engage with the pins 15 in the nut turning direction. Each groove 24 is formed approximately in a shape of the letter L by a linear portion 24a formed in the thrust direction to receive the pin 15, a turn-direction portion 24b for guiding the pin 15 in the turning direction and a terminal portion 24c formed to be orthogonal to the turn-direction portion 24b and to be parallel to the linear portion 24a to engage with the pin 15 in the turning direction.

The terminal portion 24c captures the pin 15 in a condition in which the main and trailing nuts 12 and 13 are unscrewed from the lead screw 16 and are biased away from each other by the coil spring 14.

The procedure for assembling the anti-backlash nut will be now explained.

At first, the coil spring 14 is loosely fitted around the insert portion 32 of the trailing nut 13 and the pins 15 are pressed into holes 34 of the insert portion 32 as shown in FIG. 2a. Thereby, the trailing nut 13, the coil spring 14 and the pins 15 are assembled as a unit as shown in FIG. 2b. Thereafter, the insert portion 32 of the trailing nut 13 is inserted into the cylindrical portion 22 of the main nut 12 as against the biasing force of the coil spring 14. After inserting the pin 15 into the linear portion 24a of the groove 24, the trailing nut 13 is turned in the turning direction so as to guide the pin 15 to the turning-direction portion 24b. When the pin 15 is positioned at the terminal portion 24c, the trailing nut 13 is set free. Then, the trailing nut 13 is biased away from the main nut 12 by the coil spring 14 and the pin 15 abuts against a bottom 24d of the terminal portion 24c, thus coupling the main and trailing nuts 12 and 13 as a unit. Thereby, the main nut 12, the trailing nut 13 and the coil spring 14 are coupled as a unit as the nut 11. The pin 15 engages with the groove 24 without being bent because the pin 15 is captured by the terminal portion 24c after moving through the groove 24 in this assembly process.

Because the main nut 12, the trailing nut 13 and the coil spring 14 are thus coupled as a unit, it becomes easy to store and to prevent those parts from being lost.

Thereafter, the nut 11 is screwed to the lead screw 16. At this time, the trailing nut 13 is pushed to the main nut 12 side against the biasing force of the coil spring 14 after screwing the main nut 12 to the lead screw 16. Then, the pin 15 moves to the side of the main nut 12 within the terminal portion 24c together with the trailing nut 13 and is separated from the bottom 24d of the terminal portion 24c, thus producing a gap G with the bottom 24d. Then, the trailing nut 13 is screwed to the lead screw 16 while bringing it closer to the main nut 12.

The main and trailing nuts 12 and 13 are screwed to the lead screw 16 in a condition in which the pin 15 is separated from the bottom 24d of the terminal portion 24c of the groove 24 and in which they are biased away from each other by the coil spring 14 as shown in FIG. 1. Thereby, the main nut 12 is screwed to the lead screw 16 while being biased to the left side and the trailing nut 13 to the right side in FIG. 1.

The main nut 12 moves when the lead screw 16 is turned while stopping the main nut 12 from turning temporarily in the state in which the main and trailing nuts 12 and 13 are assembled as a unit and are screwed to the lead screw 16. At this time, the trailing nut 13 tries to turn together with the lead screw 16. However, because the main nut 12 restricts the rotation of the trailing nut 13 through the engagement of the pins 15 with the grooves 24, the trailing nut 13 does not turn together with the lead screw 16 and moves together with the main nut 12 even if it receives the turning force of the lead screw 16.

Because the pin 15 is engaged with the terminal portion 24c of the groove 24 so as to have almost no gap in the turning direction of the nut, the main and trailing nuts 12 and 13 can start to move almost in the same time and a distance between the main and trailing nuts 12 and 13 does not change when the lead screw 16 starts to turn.

When the lead screw 16 is turned in reverse, the main and trailing nuts 12 and 13 produce almost no rotational leg and move swiftly in the reverse direction. Still more, because the main and trailing nuts 12 and 13 are biased away from each other by the coil spring 14, i.e., they are given the pre-load, backlash may be eliminated completely.

Further, the cylindrical portion 22 around which the grooves 24 are formed and the pins 15 have such rigidity that they will not bend when the rotation is transmitted between the main and trailing nuts 12 and 13, so that the main and trailing nuts 12 and 13 produce no rotational lag and move swiftly in the reverse direction, thus eliminating backlash completely.

In the structure described above, it is not necessary to provide four pins 15 and four grooves 24, and one each pin and groove will do. Their number is not also limited to four.

The rotation may be transmitted smoothly between the main and trailing nuts 12 and 13 by providing the plurality of pins 15 and the grooves 24 at equal intervals.

Further, when there is a phase shift between the main and trailing nuts 12 and 13 in screwing them to the lead screw 16, it is possible to eliminate such phase shift by changing the engagement of the pins 15 with the grooves 24 mostly without changing the whole length L of the nut 11 by providing the plurality of pins 15 and the grooves 24.

Still more, the provision of the plurality of pins 15 and grooves 24 enables loaded rotational torque of the lead screw 16 to be readily controlled because the distance between the main and trailing nuts 12 and 13 may be adjusted and the pre-load may be controlled when they are screwed to the lead screw 16 by changing the engagement of the pins 15 with the grooves 24.

Preferably, the pins 15 may be formed in a body with the insert portion 32. In this case, the coil spring 14 may be assembled to the insert portion 32 while being widened in the radial direction.

Although the coil spring 14 has been loosely fitted around the insert portion 32 in the embodiment described above, it may be stored within the cylindrical portion 22 to be interposed between a bottom 22a of the cylindrical portion 22 and the left end of the trailing nut 13 in FIG. 2.

Although the pins 15 have been projected through the insert portion 32 and the grooves 24 have been formed around the cylindrical portion 22 in the embodiment described above, the pins 15 may be projected toward the inside of the cylindrical portion 22 and the grooves 24 may be formed around the insert portion 32.

(Anti-backlash Nut According to a Second Embodiment)

Figure 4A:
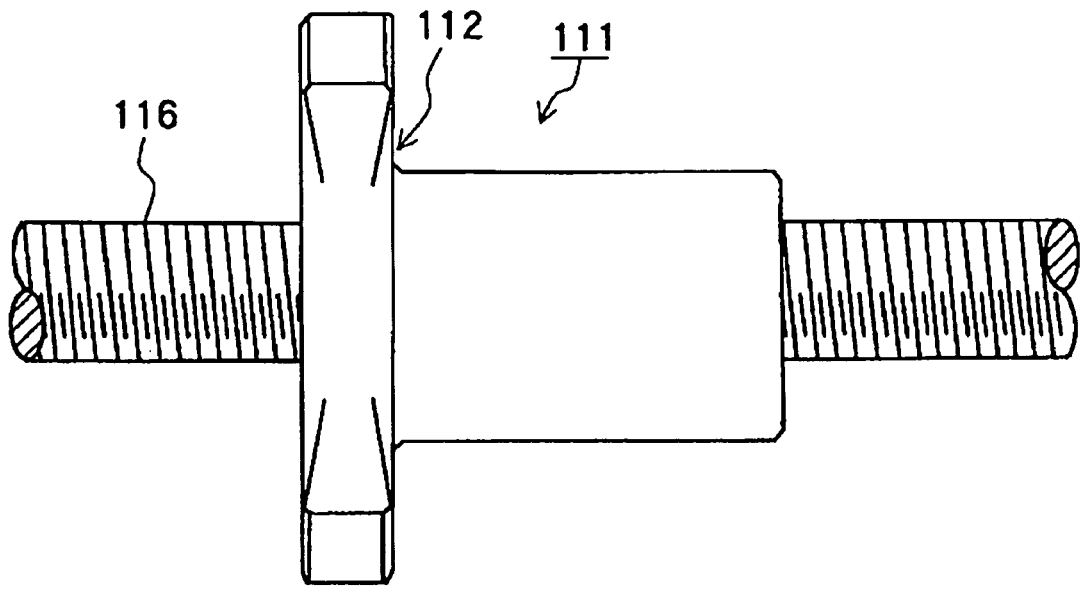
Figure 4B:
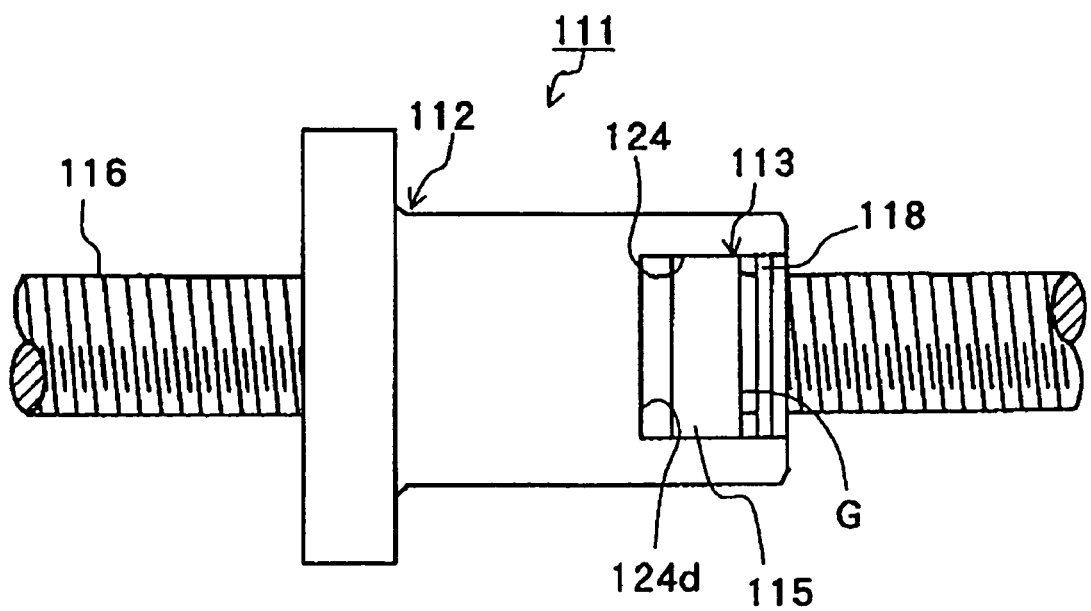
Figure 6A:
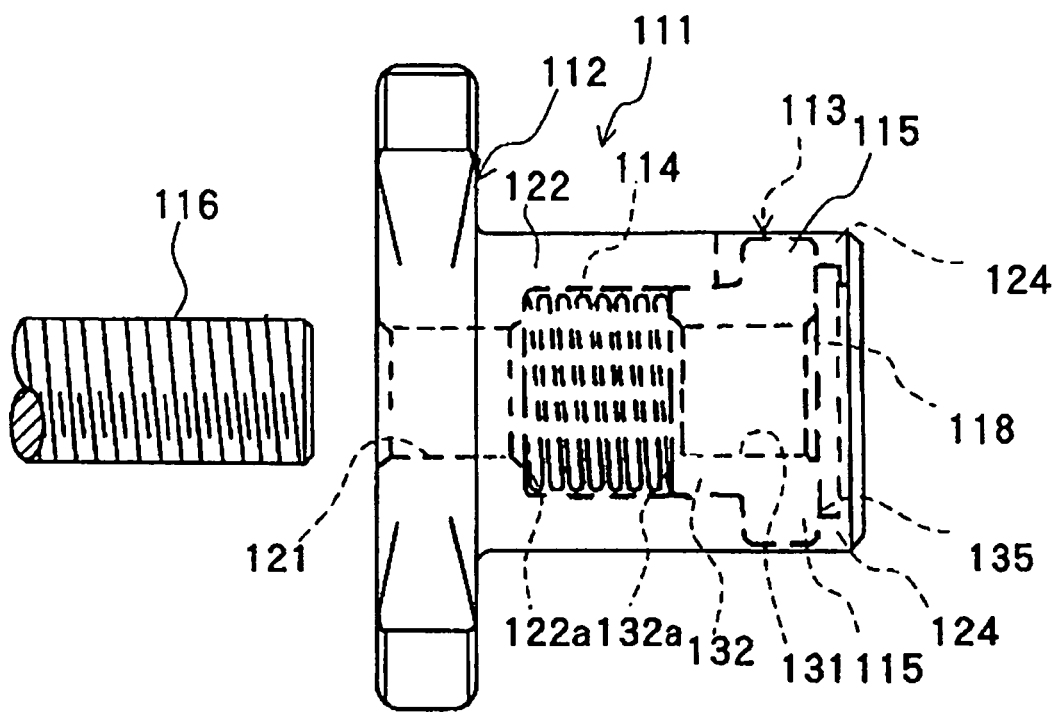
Figure 6B:
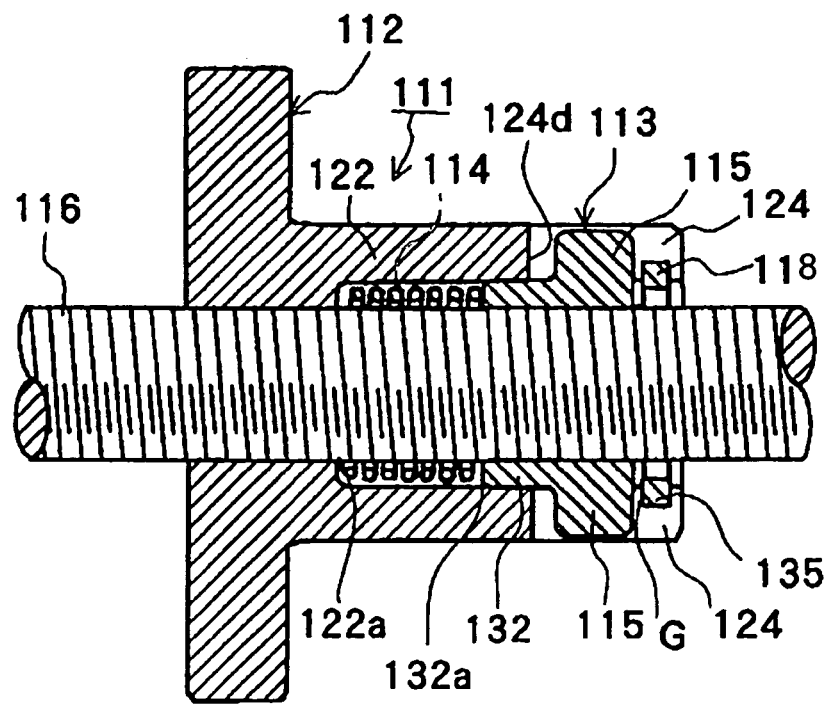

FIGS. 4a and 4b show a state in which an anti-backlash nut of the second embodiment is screwed to a lead screw, wherein FIG. 4a is a front view and FIG. 4b is a plan view. FIGS. 5a and 5b are exploded views of the nut, wherein FIG. 5a is a front view showing main and trailing nuts partially in section and FIG. 5b is a plan view thereof. FIGS. 6a and 6b show operations for assembling the nut to the lead screw, wherein FIG. 6a shows a state in which the assembly of the nut is completed by assembling the nut to the lead screw and FIG. 6b shows a state in which the nut shown in section is screwed to the lead screw. FIG. 7 is an exploded perspective view of the nut.

The structure of the nut will be explained. The nut 111 comprises a main nut 112 for example as a first nut (or a second nut), a trailing nut 113 as a second nut (or a first nut), a coil spring 114 for example as a biasing member, and a slip-out stopping ring 118 for example as a slip-out stopping member.

The main nut 112 and the trailing nut 113 are screwed to a lead screw 116 for example as a common male screw. The main nut 112 and the trailing nut 113 are formed with internal threads 121 and 131.

The main nut 112 and the trailing nut 113 are made from metal or plastics. The lead screw 116 is also made from metal or plastics. In a case in which the main nut 112, the trailing nut 113 and the lead screw 116 are made from plastics, their abrasion resistance may be enhanced by a coating of Teflon (registered trademark).

The main nut 112 is provided with a cylindrical portion 122, a receiving portion surrounding the lead screw 116, and a flange 123. The flange 123 is a part connected to the above-mentioned table, die or the like not shown.

The trailing nut 113 is provided with two projecting pieces 115 projecting outwardly in the radial direction at intervals of 180 degrees of a screw portion 132 in which the internal thread 131 is formed. The screw portion 132 is designed to be stored in the cylindrical portion 122 of the main nut 112. The cylindrical portion 122 is provided, at intervals of 180 degrees, with two grooves 124 which receive the projecting pieces 115 straightly in the thrust direction from the edge of the cylindrical portion 122 and which engage with the projecting pieces 115 in the turning direction of the trailing nut 113. The coil spring 114, i.e., the biasing member, is also designed to be stored in the cylindrical portion 122. The coil spring 114 is interposed between a bottom portion 122a of the cylindrical portion 122 and an edge 132a of the screw portion 132 of the trailing nut 113. It is noted that a resilient member such as a belleville spring and rubber having elasticity may be used instead of the coil spring 114.

The cylindrical portion 122 is provided with a ring engaging groove 135 for receiving the slip-out stopping ring 118 at the inside of the edge thereof and on the side opposite from the flange 123 along the turning direction of the main nut 112. The slip-out stopping ring 118 has resilience and may be deformed, so that it may be removably attached to the ring engaging groove 135. It is noted that a resilient stop ring having a shape of the letter C may be used instead of the slip-out stopping ring 118.

The slip-out stopping ring 118 captures the trailing nut 113 in a condition in which the main nut 112 and the trailing nut 113 are unscrewed from the lead screw 116 and are biased away from each other by the coil spring 114.

The sequence for assembling the anti-backlash nut of the present embodiment will be explained.

At first, the coil spring 114 and the screw portion 132 of the trailing nut 113 are inserted into the cylindrical portion 122 of the main nut 112 and the projecting piece 115 is inserted into the groove 124 of the main nut 112 as shown in FIG. 5a. Then, the slip-out stopping ring 118 is attached to the ring engaging groove 135 of the main nut 112 by resiliently deforming it.

The trailing nut 113 is biased and pressed away from the main nut 112 by the coil spring 114 and is captured by the slip-out stopping ring 118 as shown in FIG. 6a. It allows the main nut 112, the trailing nut 113, the coil spring 114 and the slip-out stopping ring 118 to be assembled as a unit. The projecting piece 115 moves through the groove 124 and engages therewith without being bent in this assembling process.

Because the main nut 112, the trailing nut 113, the coil spring 114 and the slip-out stopping ring 118 are thus assembled as a unit, it becomes easy to store and to prevent those parts from being lost.

Thereafter, the nut 111 is screwed to the lead screw 116. At this time, the trailing nut 113 is pushed to the side of the main nut 112 against the biasing force of the coil spring 114 after screwing the main nut 112 to the lead screw 116. Then, the projecting piece 115 moves within a terminal portion 124c together with the trailing nut 113 to the side of the main nut 112 as shown in FIG. 5b and a gap G is created between the trailing nut 113 and the slip-out stopping ring 118 as the trailing nut 113 is separated from the slip-out stopping ring 118 as shown in FIG. 6b. After that, the trailing nut 113 is screwed to the lead screw 116 while bringing it closer to the main nut 112.

The main nut 112 and the trailing nut 113 are screwed to the lead screw 116 in a condition in which the projecting piece 115 is separated from the bottom portion 124d of the terminal portion 124 of the groove 124 and from the slip-out stopping ring 118 and in which they are biased by the coil spring 114 away from each other as shown in FIG. 6b. Thereby, the main nut 112 is screwed to the lead screw 116 while being biased to the left side in FIGS. 6a and 6b and the trailing nut 113 to the right side.

The main nut 112 moves when the lead screw 116 is turned while stopping the main nut 112 from turning temporarily in a condition in which the main nut 112 and the trailing nut 113 are assembled as a unit and are screwed to the lead screw 116. At this time, the trailing nut 113 tries to turn together with the lead screw 116. However, because the main nut 112 restricts the rotation of the trailing nut 113 through the engagement of the projecting pieces 115 with the grooves 124, the trailing nut 113 does not turn together with the lead screw 116 and moves together with the main nut 112 even if it receives the turning force of the lead screw 116.

Because the groove 124 engages with the projecting piece 115 while having almost no gap in the turning direction of the nut, the main nut 112 and the trailing nut 113 start to move almost simultaneously and a distance between the main nut 112 and the trailing nut 113 does not change when the lead screw 16 starts to turn.

When the lead screw 116 is turned in reverse, the main nut 112 and the trailing nut 113 produce almost no rotational lag and move swiftly in the reverse direction. Still more, because the main nut 112 and the trailing nut 113 are biased away from each other by the coil spring 114, i.e., they are given the pre-load, backlash may be eliminated completely.

Further, because the cylindrical portion 22 around which the grooves 124 are formed and the projecting pieces 115 have such rigidity that they will not bend when the rotation is transmitted between the main nut 112 and the trailing nut 113, the main nut 112 and the trailing nut 113 produce no rotational lag and move swiftly in the reverse direction, thus eliminating backlash completely.

In the structure described above, it is not necessary to provide two projecting pieces 115 and two grooves 124, and one each groove and projecting piece will do. Their number is not also limited to be two.

The rotation may be transmitted smoothly between the main nut 112 and the trailing nut 113 by providing the plurality of projecting piece 115 and grooves 124 at equal intervals.

Further, even when there is a phase shift between the main nut 112 and the trailing nut 113 and the distance between the main nut 112 and the trailing nut 113 is changed in screwing them to the lead screw 116, it is possible to eliminate the phase shift without changing the whole length of the nut 111 because the trailing nut 113 is arranged to move almost within the range of the length of the groove 124 of the main nut 112.

Still more, because the groove 124 is formed straightly, it is possible to readily control loaded rotational torque of the lead screw 116 because the distance between the main nut 112 and the trailing nut 113 may be adjusted and the pre-load may be controlled in screwing them to the lead screw 116.

It is noted that although the projecting pieces 115 have been provided at the screw portion 132 and the grooves 124 have been formed around the cylindrical portion 122 in the embodiment described above, the projecting pieces 115 may be provided inwardly at the cylindrical portion 122 and the grooves 124 may be formed around the screw portion 132.

Figure 8A:
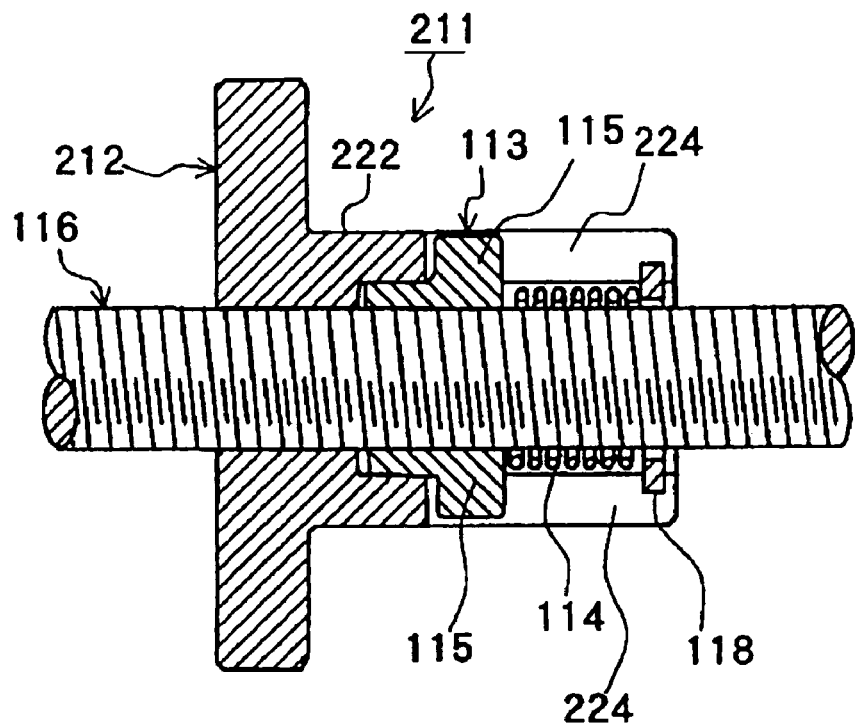
Figure 8B:
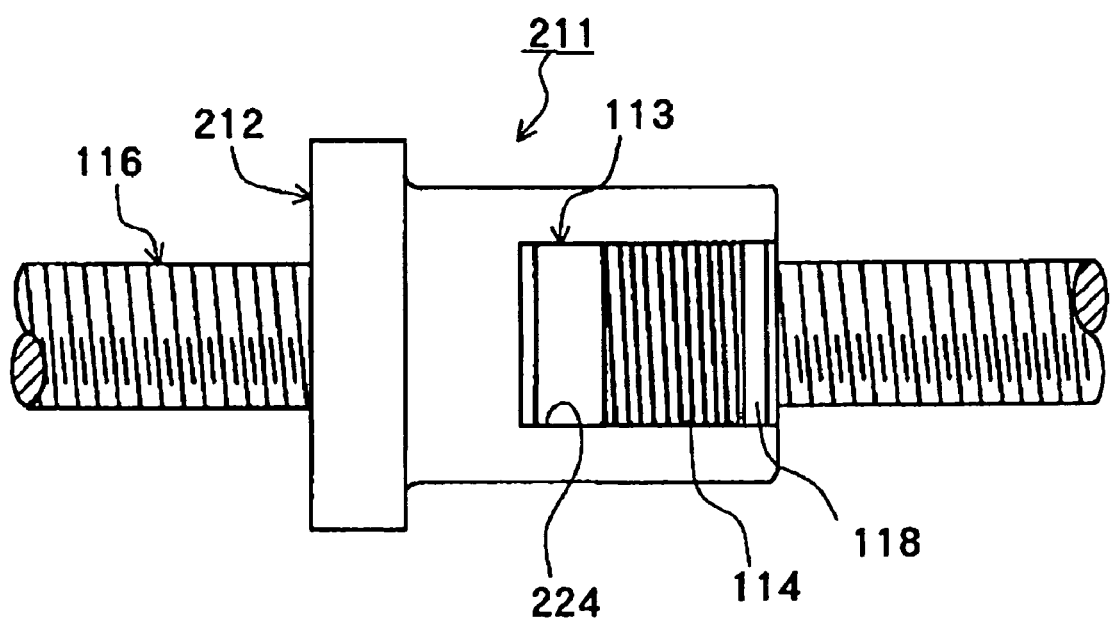
Figure 9:
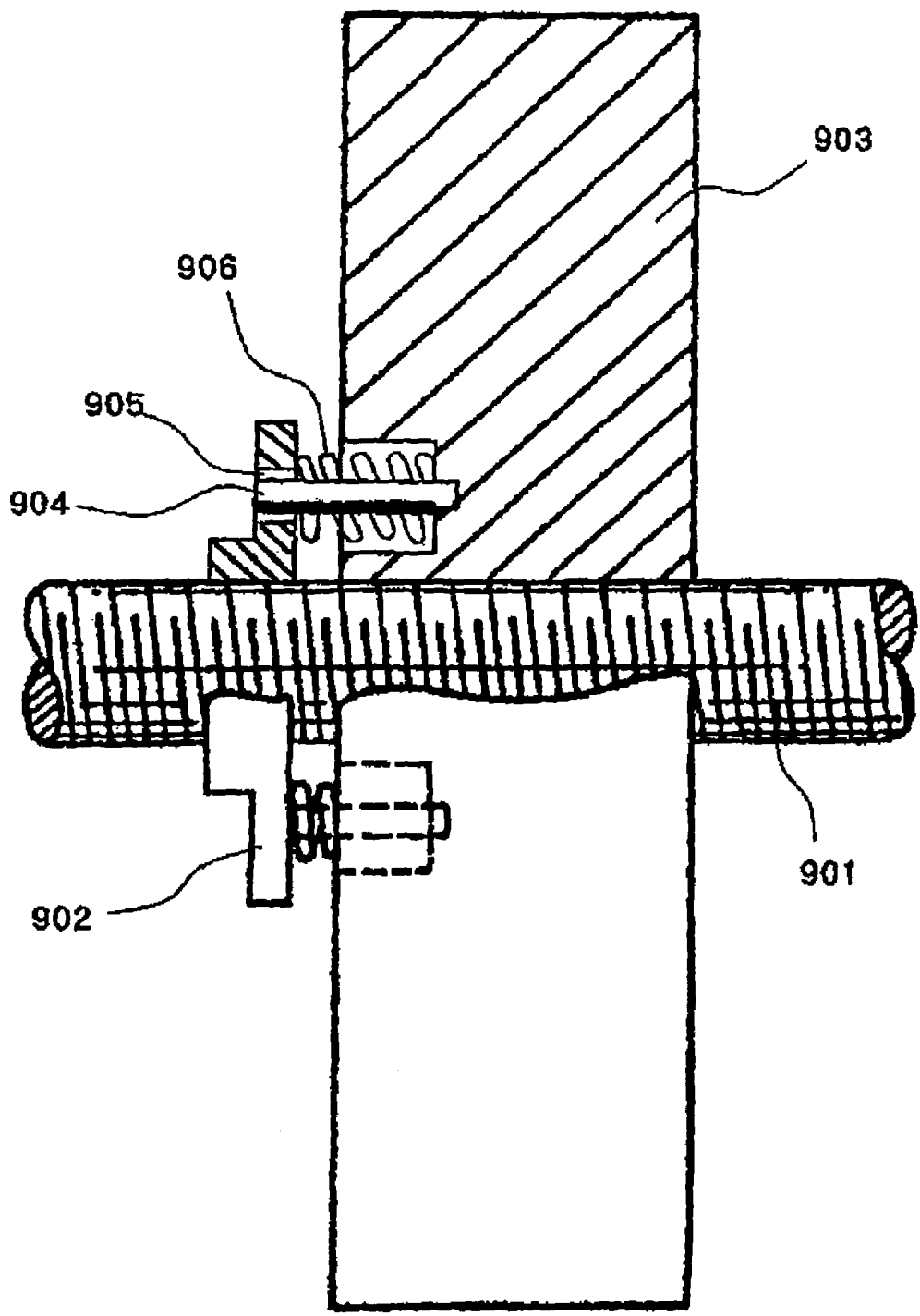
FIG. 9 is a front section view of a prior art anti-backlash nut.

Although the nut 111 has been arranged to eliminate backlash by interposing the coil spring 114 between the main nut 112 and the trailing nut 113 and by biasing both nuts 112 and 113 away from each other, it is also possible to be arranged so that a groove 224 of a main nut 212, i.e., the first nut (or the second nut) is formed deeply inside of a cylindrical portion 222, i.e., a receiving portion, to receive the trailing nut 113 deeply at the inside of the cylindrical portion 212 like a nut 211 shown in FIGS. 8a and 8b to interpose the coil spring 114 between the trailing nut 113 and the slip-out stopping ring 118 to bias the both nuts 212 and 113 in the direction of approaching to each other.

If the trailing nut 113 and the coil spring 114 in the nut 211 are interchanged to arrange them in the order as shown in FIG. 6b, the biasing force of the coil spring 114 acts on the main nut 212 and the trailing nut 113 in the direction of separating them from each other, thereby allowing the distance between the main nut 212 and the trailing nut 113 to be widened.

It is noted that the preferred embodiments described above have been applied to normal screws, and they are applicable similarly to ball screws.

As described above, the anti-backlash nuts of the present invention can move without causing backlash even when the turning direction of the male screw is changed because the first and second nuts are biased away from each other by the biasing member.

According to the anti-backlash nut of the first aspect of the invention, when the first and second nuts are unscrewed from the male screw, they are biased away from each other by the biasing member and the projections are captured by the terminal portions so that the first and second nuts and the biasing member can be kept as a unit, thereby preventing the parts from being lost and facilitating the storage of the parts.

According to the anti-backlash nut of the second aspect of the invention, when the first and second nuts are unscrewed from the male screw, they are biased in the direction of changing the distance and the second nut or the biasing member is captured by the slip-out stopper so that the first and second nuts and the biasing member can be kept as a unit, thereby preventing the parts from being lost and facilitating the storage of the parts.

Still more, because the anti-backlash nuts of the present invention are arranged so that the projections engage with the grooves without being bent, no gap is created in the relative position of the first and second nuts even when rotational force is applied to the first and second nuts.

While the preferred embodiments have been described, variations thereto will occur to those skilled in the art within the scope of the present inventive concepts.

What is claimed is:

1. An anti-backlash nut mechanism, comprising:
   first and second nuts arranged to be engaged with a male screw;
   biasing means for biasing said first and second nuts in a direction of changing a distance between them;
   receiving means formed in conjunction with said first nut to receive said second nut and said biasing means;
   projecting means projecting in a radial direction from said second nut;
   grooves which are formed around said receiving means so as to receive said projecting means from an edge of said receiving means and to engage with said projecting means in a turning direction of said nuts, said grooves extending through a peripheral wall of said receiving means; and
   slip-out stopping means for preventing said second nut and said biasing means, which are inserted into said receiving means, from slipping out of said receiving means,
   wherein said slip-out stopping means has resilience enabling it to be removably attached to said receiving means.

2. The anti-backlash nut mechanism as set forth in claim 1, wherein each of said grooves has a length capable of receiving said projecting means in an order of arrangement in which said second nut is closer to said first nut than is said biasing means.

3. The anti-backlash nut mechanism as set forth in claim 1, wherein said biasing means and said second nut are arranged in an order such that said biasing means is closer to said first nut than is said second nut.

4. An anti-backlash nut mechanism, comprising:
   first and second nuts arranged to be engaged with a male screw;
   a coil spring for biasing said first and second nuts in a direction of changing a distance between them;
   a receiving portion formed in conjunction with said first nut to receive said second nut and said coil spring;
   projecting pieces projecting in a radial direction from said second nut;
   grooves which are formed around said receiving portion so as to receive said projecting means from an edge of said receiving portion and to engage with said projecting pieces in a turning direction of said nuts, said grooves extending through a peripheral wall of said receiving portion; and
   a slip-out stopper for preventing said second nut and said coil spring which are inserted into said receiving portion from slipping out of said receiving portion,
   wherein said slip-out stopper has resilience enabling it to be removably attached to said receiving portion.

5. The anti-backlash nut mechanism as set forth in claim 4, wherein each of said grooves has a length capable of receiving said projecting pieces in an order of arrangement in which said second nut is closer to said first nut than is said coil spring.

6. The anti-backlash nut mechanism as set forth in claim 4, wherein said coil spring and said second nut are arranged in an order such that said coil spring is closer to said first nut than is said second nut.

* * * * *